US009564617B2

United States Patent
Byun

(10) Patent No.: US 9,564,617 B2
(45) Date of Patent: Feb. 7, 2017

(54) RECHARGEABLE BATTERY HAVING MINUTE CURRENT TRANSPORTING MEMBER

(71) Applicant: Samsung SDI Co., Ltd., Yongin-si, Gyeonggi-do (KR)

(72) Inventor: Sang-Won Byun, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 512 days.

(21) Appl. No.: 14/042,596

(22) Filed: Sep. 30, 2013

(65) Prior Publication Data
US 2014/0315058 A1  Oct. 23, 2014

(30) Foreign Application Priority Data

Apr. 18, 2013  (KR) .................. 10-2013-0043042

(51) Int. Cl.
*H01M 2/02* (2006.01)
*H01M 2/04* (2006.01)
*H01M 2/34* (2006.01)
*H01M 2/12* (2006.01)
*H01M 2/26* (2006.01)

(52) U.S. Cl.
CPC ............ *H01M 2/046* (2013.01); *H01M 2/043* (2013.01); *H01M 2/0408* (2013.01); *H01M 2/1241* (2013.01); *H01M 2/34* (2013.01); *H01M 2/345* (2013.01); *H01M 2/348* (2013.01); *H01M 2/263* (2013.01); *H01M 2200/00* (2013.01); *H01M 2200/106* (2013.01); *H01M 2200/20* (2013.01)

(58) Field of Classification Search
None
See application file for complete search history.

(56) References Cited

U.S. PATENT DOCUMENTS 5,783,326 A * 7/1998 Hasebe .................. H01M 2/34
429/231.1
6,296,965 B1 10/2001 Azema
(Continued)

FOREIGN PATENT DOCUMENTS

JP    2006-147180    6/2006
KR   10-2010-0015161 A   2/2010
KR   10-2010-0134511 A   12/2010

OTHER PUBLICATIONS

Extended European Search Report dated Feb. 5, 2014, for corresponding European Patent Application No. 13196087.4 (6 pages).
(Continued)

*Primary Examiner* — Alix Eggerding
(74) *Attorney, Agent, or Firm* — Lewis Roca Rothgerber Christie LLP

(57) ABSTRACT

A rechargeable battery includes an electrode assembly comprising a positive electrode and a negative electrode; a case accommodating the electrode assembly; and a cap assembly combined to the case and electrically connected to the electrode assembly, wherein the cap assembly comprises a first member and a second member that are electrically connected to each other, and a minute current transporting member located between the first member and the second member, the minute current transporting member having a larger resistance than the first member and the second member, and electrically connected to the first member and the second member.

11 Claims, 5 Drawing Sheets

(56) References Cited

U.S. PATENT DOCUMENTS

| | | | |
|---|---|---|---|
| 8,216,707 B2 | 7/2012 | Byun et al. | |
| 2010/0015508 A1* | 1/2010 | Hwang | H01M 2/0426 |
| | | | 429/56 |
| 2010/0028724 A1 | 2/2010 | Byun et al. | |
| 2010/0086835 A1* | 4/2010 | Kim | H01M 2/1241 |
| | | | 429/56 |
| 2011/0104523 A1 | 5/2011 | Lee et al. | |
| 2013/0136961 A1 | 5/2013 | Han et al. | |
| 2013/0216870 A1* | 8/2013 | Kim | H01M 10/0422 |
| | | | 429/61 |

OTHER PUBLICATIONS

KIPO Office action dated May 19, 2016, for Korean priority Patent application 10-2013-0043042, (10 pages).
English machine translation of Japanese Publication 2006-147180 dated Jun. 8, 2006, listed above, (18 pages).

* cited by examiner

RECHARGEABLE BATTERY HAVING MINUTE CURRENT TRANSPORTING MEMBER

CROSS-REFERENCE TO RELATED APPLICATION

This application claims priority to and the benefit of Korean Patent Application No. 10-2013-0043042 filed in the Korean Intellectual Property Office on Apr. 18, 2013, the entire contents of which are incorporated herein by reference.

BACKGROUND

1. Field

The described technology relates generally to a rechargeable battery.

2. Description of the Related Art

A rechargeable battery is a battery that can be repeatedly charged and discharged, unlike a primary battery. A small-capacity rechargeable battery is used for small portable electronic devices such as mobile phones, notebook computers, camcorders, and the like, while a large-capacity rechargeable battery is used as a motor-driving power source for hybrid vehicles and electric vehicles.

The rechargeable battery may be used in small electronic devices as a single-cell battery or in a motor-driving power source, etc., as a battery module where a plurality of cells are electrically connected.

A rechargeable battery typically includes a current interruptive device for preventing thermal runaway by interrupting current flow at a predetermined internal pressure of a battery. However, if an arc is generated when interrupting the current, the rechargeable battery may combust or explode.

The above information disclosed in this Background section is only for enhancement of understanding of the background of the described technology and therefore it may contain information that does not form the prior art that is already known in this country to a person of ordinary skill in the art.

SUMMARY

Embodiments of the present invention provide a rechargeable battery preventing or reducing generation of an arc.

A rechargeable battery according to the present invention includes: an electrode assembly including a positive electrode and a negative electrode; a case receiving the electrode assembly; and a cap assembly combined to the case and electrically connected to the electrode assembly, wherein the cap assembly includes a first member and a second member that are electrically connected, and a minute current transporting member located between the first member and the second member, having larger resistance than the first member and the second member, and electrically connected to the first member and the second member.

The minute current transporting member may have resistance from 100 Ω to 10,000 Ω, and the first member and the second member may be made of aluminum with a plate shape.

The first member may include a connection protrusion welded to the second member and a notch to be transformed at a predetermined pressure, and the minute current transporting member may include a through hole to insert the connection protrusion.

The minute current transporting member may include conductive carbon, and the minute current transporting member may include a polymer and conductive particles dispersed in the polymer.

The conductive particles may be metal particles or carbon particles, and the first member may be formed of a sub-plate electrically connected to the electrode assembly, while the second member may be formed of a vent plate having a connection protrusion coupled to the sub-plate by welding.

The middle plate may be installed between the vent plate and the sub-plate, the middle plate may be adhered with a lead member electrically connected to the electrode assembly, and the minute current transporting member may be located between the middle plate and the vent plate.

The minute current transporting member may have larger resistance than the middle plate, and the vent hole may be formed at the middle plate and the minute current transporting member.

The vent plate may include a notch to be transformed at a predetermined pressure, and the middle plate and the minute current transporting member may have a through hole in which the connection protrusion is inserted.

The minute current transporting member may include a base plate, a side wall protruded up and down from a side end of the base plate, and a supporting part expanded outside from an upper end of the side wall, and the insulating member may be installed between the vent plate and the middle plate, the insulating member may include a receiving hole, and the minute current transporting member may be inserted and installed to the receiving hole such that the vent plate and the middle plate may be electrically connected.

According to an exemplary embodiment, the minute current transporting member is installed such that the minute current flows when the part contacted thereto is divided, thereby preventing and reducing the generation of the arc.

DETAILED DESCRIPTION

Figure 1:
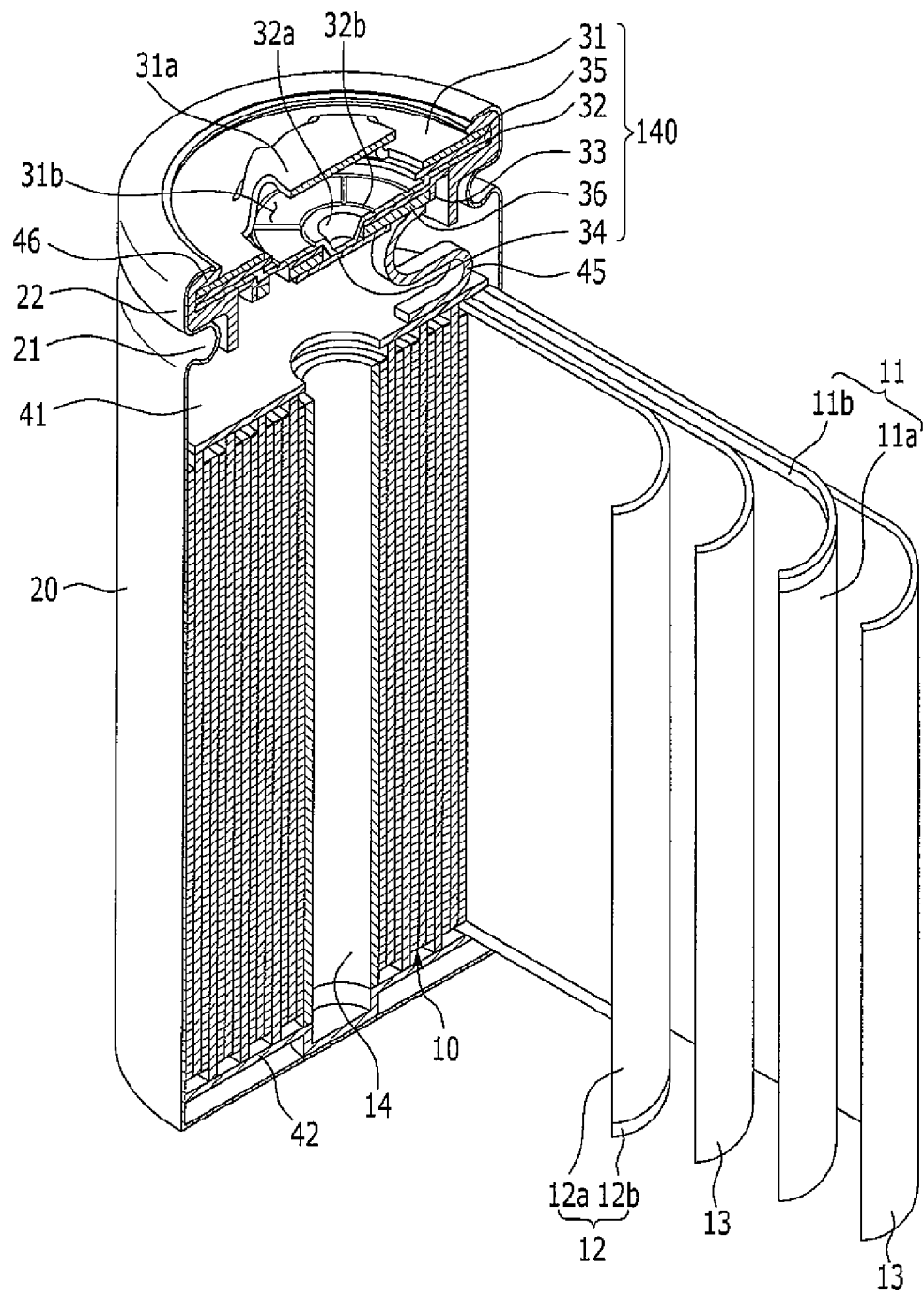
FIG. 1 is a cut perspective view of a rechargeable battery according to a first exemplary embodiment.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

FIG. 1 is a cut perspective view of a rechargeable battery according to the first exemplary embodiment.

Referring to FIG. 1, the rechargeable battery 100 according to the first exemplary embodiment includes an electrode assembly 10 generating a current, a case 20 accommodating the electrode assembly 10, and a cap assembly 30 electrically connected to the electrode array 10 by being connected to the case 20.

The electrode assembly 10 includes a positive electrode 11, a separator 13, and a negative electrode 12 that are sequentially layered. The electrode assembly 10 is formed by spiral-winding the positive electrode 11 and the negative electrode 12, with the separator 13 as an insulator located therebetween. As an example, the electrode assembly 10 is formed in a cylindrical shape. A core pin 14 is located at the center of the cylindrical electrode assembly 10. The core pin 14 is formed with a cylinder shape and supports the electrode assembly 10 to maintain the cylinder shape of the electrode assembly 10.

The positive electrode 11 and the negative electrode 12 form a current collector made of a metal foil of a thin plate, and respectively include coated regions 11a and 12a coated with an active material and uncoated regions 11b and 12b at which the active material is not coated. A positive current collecting plate 41 is connected to the uncoated region 11b of the positive electrode 11, and the positive current collecting plate 41 is located at an upper end of the electrode assembly. A negative current collecting plate 42 is connected to the uncoated region 12b of the negative electrode 12, and the negative current collecting plate 42 is located at a lower end of the electrode assembly 10 and is adhered to the bottom of the case 20 by welding.

In the exemplary embodiment, the positive current collecting plate 41 is installed at the upper portion of the electrode assembly and the negative current collecting plate 42 is installed at the lower portion of the electrode assembly, but the present invention is not limited thereto, and the positive current collecting plate may be installed at the lower portion of the electrode assembly and the negative current collecting plate may be installed at the upper portion of the electrode assembly.

The case 20 may have a cylindrical shape or a square shape with one side thereof open to allow the electrode assembly 10 to be inserted therethrough. The case 20 is connected to the negative electrode collecting plate 42 so as to serve as a negative terminal in the rechargeable battery 100, and is made of a conductive metal such as aluminum, an aluminum alloy, or nickel-plated steel.

The cap assembly 30 is inserted into the case 20 and is then fixed to the case 20 through a clamping process, and at this time, a beading part 21 and a clamping part 22 are formed at the case 20.

Figure 2:
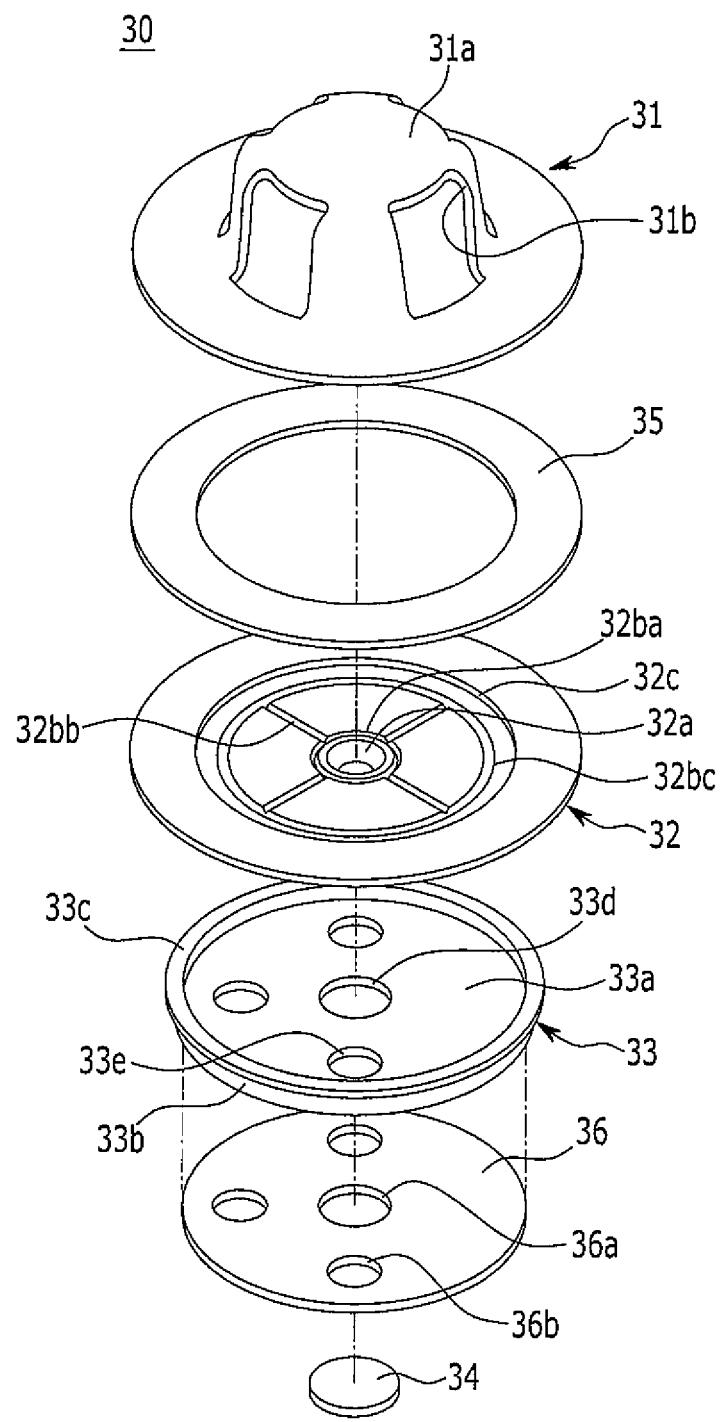
FIG. 2 is an exploded perspective view of a cap assembly according to the first exemplary embodiment.
Figure 3:
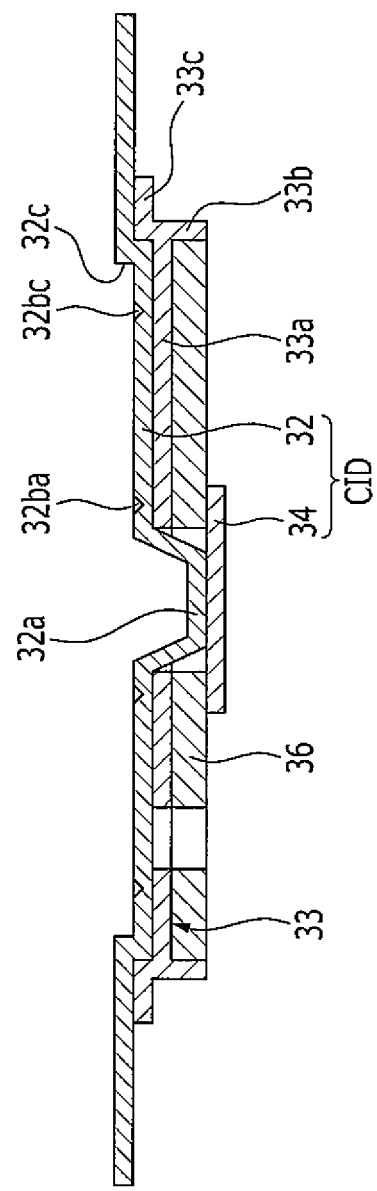
FIG. 3 is a partial cross-sectional view of a cap assembly according to the first exemplary embodiment.

FIG. 2 is an exploded perspective view of a cap assembly according to the first exemplary embodiment, and FIG. 3 is a partial cross-sectional view of a cap assembly according to the first exemplary embodiment.

Referring to FIG. 2 and FIG. 3, the cap assembly 30 according to the first exemplary embodiment is coupled to an opening side of the case 20 with a gasket 46 located therebetween to hermetically seal the case 20 accommodating the electrode assembly 10 and an electrolyte. The cap assembly 30 includes a cap plate 31, a vent plate 32, a minute current transporting member 33, a sub-plate 34, a positive temperature coefficient (PTC) element 35, and a middle plate 36.

The cap plate 31 is formed of a plate shape including an outwardly protruded terminal 31a and exhaust holes 31b. The cap plate 31 is finally connected to the positive current collecting plate 41 to serve as a positive terminal of the rechargeable battery 100.

The positive temperature coefficient element 35 is located between the cap plate 31 and the vent plate 32, and controls current flow between the cap plate 31 and the vent plate 32. The positive temperature coefficient element 35 has electrical resistance that infinitely increases when it exceeds a predetermined temperature. Therefore, charge or discharge current flow is interrupted.

The vent plate 32 is located under the positive temperature coefficient element 35, and the vent plate 32 interrupts an electrical connection of the electrode assembly 10 and the cap plate 31 in a predetermined pressure condition. Also, the vent plate 32 is configured to be fractured at the predetermined pressure condition so as to allow discharge of internal gas of the rechargeable battery 100.

Accordingly, the vent plate 32 includes a step part 32c protruded downward, a connection protrusion 32a protruded downward toward the sub-plate from the center of the step part 32c, and a notch 32b formed near the connection protrusion 32a. The notch 32b may be formed with various shapes to be broken when the internal pressure of the rechargeable battery 100 is increased. The notch according to the present exemplary embodiment includes an inner circle notch 32ba formed near the connection protrusion 32a, a radial-shaped notch 32bb radically extended from the inner circle notch 32ba to the outside, and an outer circle notch 32bc connected to an outer end of the radial-shaped notch 32bb.

Substantially, the current interruptive device (CID) is formed by the vent plate 32 and the sub-plate 34, and a connection of the current interruptive device (CID) is formed by a welding portion of the connection protrusion 32a and the sub-plate 34. When the current interruptive device (CID) is operated, the connection protrusion 32a and the sub-plate 34 are separated while the connection protrusion 32a is moved upward, and therefore the electrode assembly 10 and the cap plate 31 are electrically divided.

Also, if the internal pressure of the rechargeable battery 100 is further increased after the upward movement of the connection protrusion 32a, the notch 32b is broken and the gas generated inside the rechargeable battery 100 is discharged outside through the exhaust hole 31b.

The sub-plate 34 is formed of a circular plate shape and faces the vent plate 32 with respect to the minute current transporting member 33 to be electrically connected to the connection protrusion 32a.

Also, the middle plate 36 is located between the minute current transporting member 33 and the sub-plate 34. A through hole 36a is formed at the center of the middle plate 36 to insert the connection protrusion 32a, and a plurality of vent holes 36b are formed outside the through hole 36a to transmit the internal pressure of the rechargeable battery 100 to the vent plate 32.

A lead member 45 is fixed to the middle plate 36 by welding for electrical connection with the positive current collecting plate 41. The lead member 45 is respectively combined to the positive current collecting plate 41 and the middle plate 36 by welding such that the positive current collecting plate 41 and the middle plate 36 are electrically connected to each other.

Therefore, the middle plate 36 includes one side that is electrically connected to the vent plate 32 through the sub-plate 34 and the vent 32a, and the other side that is connected to the positive current collector plate 41 through the lead member 45. The positive current collector plate 41 is electrically connected to the cap plate 31 through the lead member 45, the middle plate 36, the sub-plate 34, the vent plate 32, and the positive temperature coefficient element 35.

In one embodiment, the minute current transporting member 33 is located between the sub-plate 34 and the vent plate 32. In detail, the minute current transporting member 33 may be located between the middle plate 36 and the vent plate 32.

The minute current transporting member 33 includes a base plate 33a, a side wall 33b protruding generally towards and away from the cap plate 31 from a periphery of the base plate 33a, and a supporting part 33c expanded outside from the upper end of the side wall 33b. The base plate 33a is formed of a circular plate shape, and includes a through hole 33d formed at the center of the base plate 33a and receiving the connection protrusion 32a, and a plurality of vent holes 33e formed outside the through hole 33d to transmit the internal pressure of the rechargeable battery 100 to the vent plate 32. The through hole 33d is connected to the through hole 36a formed at the middle plate 36, and the vent hole 33e is connected to the vent hole 36b formed at the middle plate 36.

Accordingly, the connection protrusion 32a may contact the sub-plate 34 through the through holes 33e and 36a. Also, when the internal pressure of the rechargeable battery 100 is increased, the pressure may be transmitted to the vent plate 32 through the vent holes 33e and 36b.

The side wall 33b is connected according to the circumference of the base plate 33a and protrudes from the base plate 33a. Also, the side wall 33b encloses the step part 32c position at the upper side and the circumference of the middle plate 36 positioned at the lower side. The supporting part 33c contacts the bottom surface of the vent plate 32.

The minute current transporting member 33 has larger resistance than the vent plate 32 and the sub-plate 34. Also, the minute current transporting member 33 has larger resistance than the middle plate 36.

The minute current transporting member 33 has electrical conductivity, but is formed of a material having very large resistance, for example, from about 100 Ω to about 10,000 Ω. If the resistance of the minute current transporting member 33 is smaller than 100 Ω, a relatively large charge and discharge current flows after the vent plate 32 and the sub-plate 34 such that the internal pressure of the rechargeable battery 100 is continuously increased. Also, if the resistance of the minute current transporting member 33 is larger than 10,000 Ω, when the connection protrusion 32a and the sub-plate 34 are divided, the current flowing through the minute current transporting member 33 is very small such that the arc may be generated.

In various embodiments, the resistance of the minute current transporting member 33 may be differently determined depending on the capacity of the rechargeable battery 100. For example, when the capacity of the rechargeable battery 100 is large, the resistance of the minute current transporting member 33 may be determined to be relatively small, and when the capacity of the rechargeable battery 100 is small, the resistance of the minute current transporting member 33 may be determined to be relatively large.

Accordingly, the minute current transporting member 33 is formed of a structure in which conductive particles are dispersed in a polymer. The conductive particles may be made of metal particles of copper, aluminum, silver, or stainless steel, or may be made of a carbon such as carbon black and carbon nanotubes. However, the present invention is not limited thereto, and the minute current transporting member 33 may be formed of a structure, for example, in which conductive carbon is dispersed in an insulator.

As described above, if the minute current transporting member 33 is installed when the connection protrusion 32a and the sub-plate 34 are divided the minute current flows through the minute current transporting member 33 such that the generated arc between the connection protrusion 32a and the sub-plate 34 may be prevented or reduced. When the capacity of the rechargeable battery 100 is small, the generation of the arc may be prevented, and when the capacity of the rechargeable battery 100 is large, the magnitude of the arc may be reduced.

Figure 4:
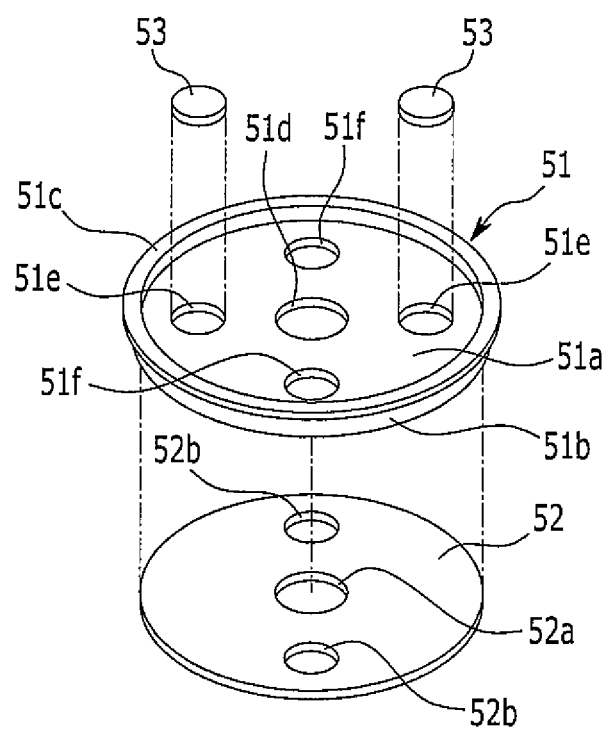
FIG. 4 is an exploded perspective view of a minute current transporting member and a middle plate of a rechargeable battery according to a second exemplary embodiment.
Figure 5:
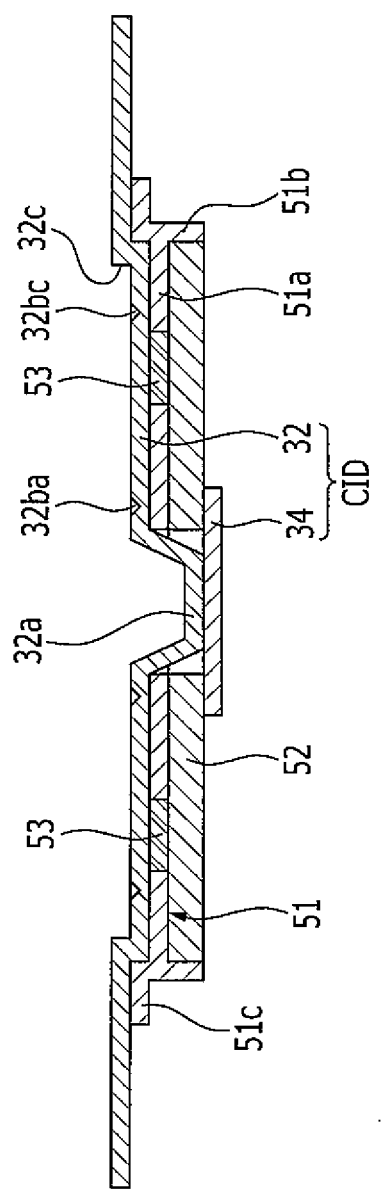
FIG. 5 is a partial cross-sectional view of a cap assembly according to the second exemplary embodiment.

FIG. 4 is an exploded perspective view of a minute current transporting member and a middle plate of a rechargeable battery according to the second exemplary embodiment, and FIG. 5 is a partial cross-sectional view of a cap assembly according to the second exemplary embodiment.

Referring to FIG. 4 and FIG. 5, the rechargeable battery according to the present exemplary embodiment has the same structure as the rechargeable battery according to the first exemplary embodiment except for a minute current transporting member and a middle plate.

In one embodiment, the middle plate 52 is located between a minute current transporting member 53 and a sub-plate 34. In detail, the middle plate 52 is located between an insulating member 51 and the minute current transporting member 53, and the sub-plate 34.

A through hole 52a is formed at the center of the middle plate 52 to accommodate the connection protrusion 32a, and a plurality of vent holes 52b are formed outside the through hole 52a to transmit the internal pressure of the rechargeable battery 100 to the vent plate 32.

The minute current transporting member 53 is inserted and installed to the insulating member 51, and in this case, the insulating member 51 is formed of polymer having an electrical insulating quality. The insulating member 5115 located between the middle plate 52 and the vent plate 32. The insulating member 51 includes a side wall 51b connected up and down from the side end of a base plate 51a, and a supporting part 51c expanded outside from the upper end of the side wall 51b. The base plate 51a is formed with a circular plate shape, and includes a through hole 51d formed at the center of the base plate 51a and receiving the connection protrusion 32a, and a receiving hole 51e formed outside the through hole 51d to accommodate the minute current transporting member 53. Also, a plurality of vent holes 51f to transmit the internal pressure of the rechargeable battery 100 to the vent plate 32 are formed outside the through hole 51d. The through hole 51d is connected to the through hole 52a formed at the middle plate 36, and the vent hole 51f is connected to the vent hole 52b formed at the middle plate 36.

The insulating member 51 includes two receiving holes 51e and two vent holes 51f, and the vent holes 51f are located between the receiving holes 51e according to the circumference direction of the insulating member 51. However, the present invention is not limited thereto, and the receiving holes 51e and the vent holes 51f may be formed with any desired number. The through hole 51d is connected to the through hole 52a formed at the middle plate 52, and the vent hole 51f is connected to the vent hole 52b formed at the middle plate 52.

The side wall 51b is connected according to the circumference of the base plate 51a, and protrudes from the base plate 51a. Also, the side wall 51b encloses the step part 32c positioned at the upper side and the circumference of the middle plate 52 positioned at the lower side. The supporting part 51c contacts the lower surface of the vent plate 32.

The minute current transporting member 53 is inserted and accommodated in the receiving hole 51e and is formed of the approximately circular plate shape. Accordingly, the minute current transporting member 53 electrically connects the middle plate 52 and the vent plate 32.

The minute current transporting member 53 has larger resistance than the vent plate 32 and the sub-plate 34. Also, the minute current transporting member 53 has larger resistance than the middle plate 52. The minute current transporting member 53 has electrical conductivity, but is formed of a material having very large resistance, for example, from about 100 Ω to about 10,000 Ω.

The minute current transporting member 53 is formed of a structure in which conductive particles are dispersed in a polymer. The conductive particles may be made of metal particles of copper, aluminum, silver, or stainless steel, or may be made of a carbon such as carbon black and carbon nanotubes.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

| | |
|---|---|
| 100: rechargeable battery | 10: electrode assembly |
| 11: positive electrode | 12: negative electrode |
| 13: separator | 14: core pin |
| 20: case | 30: cap assembly |
| 31: cap plate | 32: vent plate |
| 32a: connection protrusion | 32b: notch |
| 32c: step part | 33, 53: minute current transporting member |
| 33a, 51a: base plate | 33b, 51b: side wall |
| 33c, 51c: supporting part | 33d, 51d, 36a, 52a: through hole |
| 33e, 51f, 36b, 52b: vent hole | 34: sub-plate |
| 35: positive temperature coefficient element | 36, 52: middle plate |
| 41: positive current collecting plate | 42: negative current collecting plate |
| 45: lead member | 46: gasket |
| 51: insulating member | 51e: receiving hole |

What is claimed is:

1. A rechargeable battery comprising:
    an electrode assembly comprising a positive electrode and a negative electrode;
    a case accommodating the electrode assembly; and
    a cap assembly combined to the case and electrically connected to the electrode assembly, wherein the cap assembly comprises a first member and a second member that are electrically connected to each other, and a minute current transporting member located between the first member and the second member, the minute current transporting member having a larger resistance than the first member and the second member, and being electrically connected to the first member and the second member,
    wherein the minute current transporting member has a resistance from about 100 Ω to about 10,000 Ω,
    wherein the first member comprises a sub-plate electrically connected to the electrode assembly, and the second member comprises a vent plate having a connection protrusion coupled to the sub-plate by welding,
    wherein a middle plate is installed between the vent plate and the sub-plate, the middle plate being adhered with a lead member electrically connected to the electrode assembly, and wherein the minute current transporting member is located between the middle plate and the vent plate,
    wherein an insulating member is installed between the vent plate and the middle plate, wherein the insulating member includes a receiving hole, and wherein the minute current transporting member is accommodated by the receiving hole such that the vent plate and the middle plate are electrically connected to each other.

2. The rechargeable battery of claim 1, wherein the first member and the second member comprise aluminum with a plate shape.

3. The rechargeable battery of claim 1, wherein the first member includes a connection protrusion welded to the second member and a notch to be transformed at a predetermined pressure, and
    wherein the minute current transporting member has a through hole to accommodate the connection protrusion.

4. The rechargeable battery of claim 1, wherein the minute current transporting member comprises conductive carbon.

5. The rechargeable battery of claim 1, wherein the minute current transporting member comprises a polymer and conductive particles dispersed in the polymer.

6. The rechargeable battery of claim 5, wherein the conductive particles comprise metal particles or carbon particles.

7. The rechargeable battery of claim 1, wherein the minute current transporting member has larger resistance than the middle plate.

8. The rechargeable battery of claim 1, wherein the vent hole is at the middle plate and the minute current transporting member.

9. The rechargeable battery of claim 8, wherein the vent plate includes a notch to be fractured at a predetermined pressure.

10. The rechargeable battery of claim 1, wherein the middle plate and the minute current transporting member each have a through hole accommodating the connection protrusion.

11. The rechargeable battery of claim 1, wherein the minute current transporting member comprises a base plate, a side wall protruding generally towards and away from the electrode assembly from a periphery of the base plate, and a supporting part extending from the side wall.

* * * * *